(12) United States Patent
Regueiro

(10) Patent No.: US 7,040,279 B2
(45) Date of Patent: May 9, 2006

(54) ENERGY-CELL COMBUSTION SYSTEM

(76) Inventor: Jose Francisco Regueiro, 1470 Ashton Dr., Rochester Hills, MI (US) 48309-2249

( * ) Notice: Subject to any disclaimer, the term of this patent is extended or adjusted under 35 U.S.C. 154(b) by 0 days.

(21) Appl. No.: 10/378,280

(22) Filed: Mar. 3, 2003

(65) Prior Publication Data
US 2004/0020457 A1 Feb. 5, 2004

Related U.S. Application Data

(60) Provisional application No. 60/362,104, filed on Mar. 5, 2002.

(51) Int. Cl.
*F02B 19/08* (2006.01)
*F02B 19/14* (2006.01)
(52) U.S. Cl. ...................... 123/254; 123/261; 123/263; 123/276; 239/533.12
(58) Field of Classification Search ................ 123/254, 123/261, 275, 276, 279, 298, 299, 300, 305, 123/262, 263; 239/5, 533.2, 533.3, 533.4, 239/533.12
See application file for complete search history.

(56) References Cited

U.S. PATENT DOCUMENTS

| 1,818,339 | A | * | 8/1931 | Lang ........................... 123/276 |
| 5,103,776 | A | * | 4/1992 | Sato ........................... 123/261 |
| 5,645,028 | A | * | 7/1997 | Matsuoka et al. .......... 123/276 |

* cited by examiner

Primary Examiner—Tony M. Argenbright

(57) ABSTRACT

A Divided Chamber combustion system comprising an energy-cell built in the bottom of a deep piston bowl; aligned in the cylinder's centerline; in fluid communication with the main combustion chamber through one main transfer passage disposed in its centerline and a plurality of auxiliary transfer passages circularly disposed around it. Each auxiliary transfer passage is at least inclined on a plane parallel to the cell's centerline. The injection nozzle, centrally-located in the fire deck of the cylinder head, includes a central pintle discharging fuel on the cylinder's centerline; and a plurality of small auxiliary orifices circularly surrounding the central pintle; discharging at a radial angle to the cylinder's centerline.

19 Claims, 6 Drawing Sheets

SECTION A-A

ENERGY-CELL COMBUSTION SYSTEM

RELATED APPLICATION

This utility application relates the Provisional Application Ser. No. 60/362,104 filed Mar. 5, 2002 having the same title and the same sole inventor.

TECHNICAL FIELD

This invention relates to internal combustion engines, and more particularly to diesel engines having an energy-cell combustion system.

BACKGROUND OF THE INVENTION

Present Open-Chamber, or Direct Injection (DI) type diesel engines face major environmental pressures. Several sophisticated technologies are being used; such as four-valves; single or double overhead camshafts (SOHC or DOHC); electronically-controlled high-pressure injection, turbocharging and aftercooling. These technologies are now reaching a point of diminishing returns and are no longer capable of delivering the manifold emissions reductions necessary for future engines. Also, new solutions being sought such as injection timing using multiple injections (both before and after the main injection-period); exhaust-gas recirculation (EGR); fuel injection into the exhaust manifold, soot traps and selective catalyst reduction (SCR) are essentially add-on technologies alien to the basic engine.

The aforementioned technologies, in varied degrees, are either bulky and expensive, or create excessive back-pressure which reduces the power output while increasing the fuel consumption; or increase the emissions of soot and PM to reduce the emissions of $NO_x$; or require expensive urea injection into the exhaust stream; or increase engine wear and reduce durability. In summary, they reflect a basic impossibility of solving the combustion problems of today's engines.

Most of today's high-speed DI engines use swirl as a main combustion accelerator. The swirl concept is old and has become nearly universally used especially after the 1950's. During the last fifteen years, high-pressure injection has been used and partially reduces the need for providing swirl. Swirl decreases the air flow and consumes much pressure energy as it is induced through long helical intake ports. This undesirably produces ports with high surface to volume (S/V) ratios. The air flow through these long ports; and the increased exposure of the air to the hot engine coolant through the port walls, raises the temperature of the air entering the cylinder during the intake stroke and, once inside the cylinder, the swirling air scrubs the hot walls, piston and cylinder head; further increasing the air temperature. The increased temperature lowers the density and mass of the air; thus reducing the air throughput and power output of the engine. The situation is aggravated because the engines cannot use high degrees of overlap to scavenge the cylinder of the exhaust gas residuals left over from the previous combustion cycle, or to cool the chamber and start the new induction process with fresh air which, at lower temperature and with higher density, increases the air mass. High overlap is not used because it forces valve-relief pockets (notches) on the piston top; and the notches interfere with the swirl. Therefore, further power losses are incurred, with increases in fuel consumption and emissions ($NO_x$, Hc, soot, PM and smoke). The increased soot and smoke, in passing through the piston rings, increase the piston, ring, ring groove and liner wear while contaminating the oil; forcing more-frequent oil and filter changes. Lacking the cooling benefits of overlap, those same components, plus the turbocharger; run hotter, reducing their life.

There are benefits of valve overlap as generated by an early intake valve opening (IVO) and a late exhaust valve closing (EVC). One benefit is that, with an earlier IVO it is also possible to use an intake valve closing (IVC) earlier than possible with current engines. This reduces the amount of air that flows back-out of the cylinder through the still-open intake valves (called backflow or spit-back) as the piston passes BDC and starts the compression stroke; which is especially a problem with late IVC during engine starting and at low-speeds. An early IVC improves the cold start-ability and the idle quality by increasing the trapped air mass (TAM) and the effective compression ratio ($CR_e$).

The diesel engine process has always been thought to require high compression ratio to initiate combustion of the injected fuel. This is a very-simplistic approach and normally a higher ratio is provided than needed for normal operation. In SAE Paper 2001-01-0271; titled "The Case for New Divided-Chamber Diesel Combustion Systems", Part One: Critical Analysis of Current DI and Past Significant Divided-Chamber Engines; presented to the 2001 SAE World Congress in Detroit, Mich.; Mar. 5–8, 2001; I discussed many earlier engines that demonstrated that high Nominal Compression Ratio )$CR_n$) was only needed for starting cold; not for normal operation. Furthermore, in two companion papers (SAE 2001-01-0274 and 2001-01-0278, presented to the SAE Congress on the same day) I proposed that what is needed for good cold startability and good, smooth, quiet idle is neither high $CR_n$ nor high air temperature; but high Enthalpy of the TAM. The higher Enthalpy results from the increase in energy (temperature and pressure), during compression of the increased TAM in the cylinder, utilizing an IVC earlier than what is used today. The combustion-philosophy changes, which can also be enhanced by additional injection-timing retardation, reduce the delay time of the fuel, for improved combustion initiation and startability, and also reduces the combustion noise (Diesel Knock), as less fuel is ignited simultaneously because less fuel is injected during the shorter delay period. The softer, more-retarded initiation of combustion also reduces the $NO_x$, soot, PM and smoke emissions. Additionally, part of the negative combustion work (work on the piston as a result of combustion before TDC); which is eliminated and produces improved Mechanical Efficiency (automatically reducing the fuel consumption); as well as reduced firing pressure ($P_{max}$) and the rate at which the cylinder pressure increases (Rate of Rise, or ROR). Still more, today's common wisdom ignores the effects of both the increased $CR_e$ and TAM. This is a philosophical engineering riddle; for, to maintain the high $CR_n$, designers do not want to create the piston pockets which allow the intake and exhaust valves to obtain partial lift; freely and simultaneously, as they "cross" during overlap without hitting the piston. One reason is that, as already mentioned, the piston pockets interfere with the carefully-orchestrated swirl; and another is that the pockets create volumes which increase the combustion chamber's Clearance Volume ($C_v$); which of course reduces the $CR_n$. The fact that with deeper intake pockets atop the piston, the increases in $CR_e$ obtained by advancing the intake-valve events and having the valve(s) lift into the piston pockets are, to a point, larger than the losses of $CR_n$ has also been ignored. On paper 2001-01-0278 a chart (labelled FIG. 1) clearly indicates that, up to a point, the $CR_e$ increase more than compensates for the $CR_n$ reduction; and that the TAM increases, for the particular example, from 72% to 95% of the cylinder volume; this being the reason for the improved startability of the test engine.

We should not ignore that, by reducing the $CR_n$ while advancing the IVC on one of today's engines it is possible to maintain the $CR_e$ while reducing the chamber's S/V and increasing the TAM; thus further improving the startability and idle quality of the engine.

Additionally, another beneficial effect of overlap is also ignored; which is that it improves the high-speed, high-load gas exchange and eliminates the potential recompression spike of the exhaust gas trapped in the cylinder, which effectively increases the negative cylinder-work and robs the engine of usable power output while increasing the fuel consumption, emissions, ROR and $P_{max}$. With the new air-cycle philosophy of this invention, one of the basic tenets is to solve the fundamental combustion problems without swirl; as swirl imposes far too many undesirable compromises. The elimination of swirl, and the increase in valve overlap, are sufficient to categorize the new combustion process which produces major thermodynamic improvements in engine operation. This is especially so as the changes can be simply obtained by advancing the intake camshaft or intake cam lobes and forming valve-relief pockets in the pistons.

A problem being faced by today's trucking industry is the inability of hiring, and retaining, professional drivers. The situation has become so difficult that many trucking companies are now doing their long-distance shipping by rail. This, of course, makes them share their earnings with the railroads, and reduces their profits. The sale of trucks, and engines, by the Original Equipment Manufacturers, also suffers; as well as the funding to continue doing engine research. Part of a driver's dissatisfaction stems from the constant need to shift gears; because it is tiring, distractive, time-consuming, dangerous and wears-out the drivetrain. To compensate, and ease the driver's load, engines for Class Eight trucks are being produced with up to 600 HP. This, of course, is very expensive. What is needed is engines with "constant horsepower" (or high torque-rise). If an engine rated at 2000 rpm can increase its torque by 50% (50% torque rise or torque back-up) while lugging its speed down to 1000 rpm; it achieves "constant horsepower" between 1000 rpm and 2000 rpm. This is extremely important, for a truck can then climb hills without shifting gears utilizing a simpler, cheaper, lighter and more-efficient transmission with less gear-ratios; for less wear and tear on the equipment and the driver and reduced overall cost, as high-load operation at low speed also reduces the fuel consumption and emissions. With today's turbocharging technologies, including electronically-controlled Variable Area Turbines (and maybe also compressors) or waste-gates; plus common-rail fuel injection systems, a tremendous amount of air can be processed at low-engine speeds, and the necessary fuel to burn it can also be handled. Both of these technologies can go a long-way towards the desired "constant horsepower" engine; what is missing, however, is the ability to retain all that air in the cylinder by preventing low-speed backflow. This can only be achieved by using early IVC. Early IVC, by advancing the intake events on an otherwise "fixed timing camshaft"; or by using variable-valve timing (which also produces a Variable Effective Compression Ratio— VECR—and increases low-speed TAM), is impossible if the valve(s) interfere with the piston during overlap and notches are not provided. Early IVC, and the resultant higher $CR_e$ with $CR_n$ reduction also reduces the sensitivity to manufacturing tolerances. Unfortunately, none of these benefits can be obtained with today's engines because the required deep piston notches destroy the swirl. The reduction or elimination of swirl then becomes necessary to operate the engine with a better thermodynamic air-cycle and to produce a new type of torque curve, using other means of accelerating the combustion process; as proposed in this application.

The new combustion system as described in this application is intended to replace current combustion technologies; both the newest direct injection (DI) and the older divided-chamber designs. This new system must be more efficient than swirl in generating a combustion-acceleration process; and thus, it will not have to accelerate all the air into any kind of forced, unnatural motion. The intake air will not gain as much heat or lose as much pressure from flow through long tortuous intake ports and along cylinder walls and, finally, since combustion will occur only primarily after TDC, the combustion-acceleration process will take place only primarily after TDC. To achieve this new air-cycle philosophy and combustion system, piston notches; to prevent piston-to-valve interference during overlap, are provided. To achieve a faster, more efficient combustion process than those of older divided-chamber systems, the restriction between the divided-chamber and the main chamber must be reduced; the mixing of air and fuel inside the divided-chamber must be improved; and the discharge of products of divided-chamber combustion into the main chamber must be faster and more efficient; with less pressure and temperature losses and with improved coverage of the main-chamber volumes.

A new fuel system is also necessary to provide variable fuel flow at the beginning of injection, so as to avoid an excessive amount of fuel injected during the ignition delay, to reduce the noise and $NO_x$; yet, once the delay is completed, and the fuel quietly ignited, the fuel flow rate must be increased, to, in combination with the combustion acceleration feature generated and used quickly only after TDC, rapidly complete the combustion process to improve its efficiency. This will limit the ROR and $P_{max}$; to allow more load (air) to be carried into the cylinder, so as to produce more power without reaching the $P_{max}$ levels that engines are encountering today; levels which force the use of stronger, heavier, more-expensive components. The new combustion process would increase the Mechanical Efficiency of the engine, to increase the power output and Thermal Efficiency; while reducing the emissions of $NO_x$, PM, smoke, soot and noise.

Some old divided-chamber engines showed some desirable combustion characteristics. The Lanova combustion system, discussed in the aforementioned SAE Paper 2001-01-0271, provides one example. Lanova placed a horizontal injector, transversely to the engine centerline, in the lower part (fire-deck) of the cylinder head, and a single-orifice energy-cell opposite to it, on the other side of the cylinder, also either horizontally or at a slight upward inclination from the horizontal; the inclination forced upon by physical difficulties. On these two-valve 1930's engines, a main-combustion chamber was formed in the cylinder head; between the injector and the energy-cell. The chamber was formed by deeply recessing both the intake and the exhaust valves into the cylinder head; for a so-called "Dual-Lobe" design used mostly on industrial, truck and bus engines. Later, the "Single-Lobe" design was adopted for smaller engines which could not obtain the desired $CR_n$ with two lobes; on these smaller engines, only the intake valve was recessed. The deep intake valve recession, and the "lobe" thus formed, provided enough vertical space to locate the injector and the Energy-Cell in the cylinder head; far-enough away from the fire deck so that there was sufficient metal thickness between it and the injector on one side, and the Energy-Cell on the other. With either the single or dual lobe designs, the large valves which were typical of the Lanova engines overlapped the engine's bore and thus took advantage (at least in the case of the single intake lobe) of the lobe's great depth; allowing the intake valve to open fully into it without hitting either the block or the piston. With such freedom, the intake valve could have many possible timing characteristics and thus advanced intake-valve timing; with early IVO and IVC. The injector typically used a throttling-pintle nozzle tip which limited the amount of fuel injected up-front, during the delay period, to obtain extremely good, smooth, quiet cold starts; and then, after ignition, sprayed the main bulk of fuel typically on a 4° cone. The periphery of the cone would "peel-off" as it crossed the main chamber, and mix with the air in it; igniting while airborne. The core of the fuel plume would continue, and enter the energy-cell to burn with the air present therein. Injection would typically begin a few degrees before TDC, timed so that, with the cylinder air at near maximum compression temperature, combustion of the spray cone would start around TDC. The subsequent violent combustion in the energy-cell, utilizing only a small portion of the combustion air, produced a strong reflux of burning products back into the still-flowing fuel-injection plume in the intake lobe; to break it up and mix it with the air, while producing a swirl action within the intake lobe and complete the burn very quickly while the injection lasted. On "Dual Lobe" systems, the fuel plume would be pushed backwards against the injector, forming two counter-rotating swirl streams inside both "lobes" as the piston started on its expansion stroke. This unique, strong and fast combustion-acceleration mechanism did not waste energy by inducing swirl on all the air in the cylinder, typically a full revolution before combustion (during the intake stroke). It also did not waste energy by starting the combustion process long-before TDC, and creating negative work. It, therefore, yielded a cycle better described as being of "Constant Pressure". The Lanova system, with its late but fast combustion; and relatively low $P_{max}$, allowed light engines (sometimes actually based on gasoline-engine blocks and cylinder heads) to be converted to simple diesels quickly and cheaply, with minimum development; something very critical during the Depression, WWII and the Post-War period. The specific issue of fuel consumption of all the diesels; included Lanovas, was not a priority then. Although high by today's standards, it was good-enough then, using almost half as much fuel (and of lower cost and higher thermal energy) than the competitive gasoline engines which, with low Compression Ratios, poor "L" head combustion chambers, and with leaky carburetors, wasted and spilled and incredible amount of expensive fuel. The Lanovas also had incredibly smooth and quiet cold-starting and idling characteristics. For years, well into the 1950's, much philosophical controversy abounded about how the engines could accomplish such feats, and also exhibit low ROR and $P_{max}$ ; especially when the compression ratios ($CR_n$) were seldom higher than 12.4:1; when the chamber's S/V was so high; and when the energy-cell had such large thermal losses as it also had very-large S/V and was made of steel (with high Specific Heat and Heat Transfer Coefficient). In fact, the problem is still incomprehensible to many. The issue whether combustion started in the energy-cell or in the main chamber was debated for decades, almost to the dying days of the system, and was never fully-explained, In retrospect, it seems that our ancestors were pretty happy with what they had and were not interested in really finding-out why. It was truly a great technical loss that they never found-out why the engines performed, thermodynamically, as they did; for if the true reasons had been found-out, the path of diesel engine technology could have been changed dramatically; by improving designs based on those findings. I have insisted, for many years (and finally demonstrated as explained in the three SAE papers of reference) that the root base of all the unexplained phenomena was that the engines had very-good overlap (in the dual-lobe system), or at least, early IVC (in both the dual and single-lobe types); and that it was the increased TAM and very-high $CR_e$ (from early IVC); with higher Enthalpy in the air at the moment of injection, that was the secret behind it all. The overlap (and early IVC) were not easily noticed because the valves were recessed into the "Combustion Lobes" and did not require valve-relief pockets on top of the pistons. To the casual observer, the fact that overlap was present was not obvious. And, as a consequence, the early IVC went unnoticed. There is strong evidence that even the Lanova Corporation, or its owner, the brilliant inventor Frantz Lang, did not understand the phenomena, for they never advertised it or even wrote about it (or improved the design as I am doing now); instead argued for years (and changed opinion twice) about combustion started in the energy-cell or in the main chamber.

The Lanova combustion system, on the other hand, was not applicable to four-valve engines; it would have required major modifications to survive to the present day (modifications such as I am proposing now). It had high thermal losses from the high S/V and poor materials in the energy-cell; and suffered major problems with mechanical failures from the thin metal sections in the cylinder head fire-deck; below the horizontally-placed injector and energy cell. Also, the relatively unsophisticated fueling of the energy-cell; and the fact that the distance between the injector nozzle tip and the transfer passage into the energy-cell was constant, under some operating conditions allowed a large excess of fuel to enter the cell. This could create very-rich mixtures with the limited air-mass within the cell, forming heavy soot therein. The soot ultimately filled the cell, rendering it ineffective, and required frequent maintenance to remove it. With all these problems, the Lanova system carried the seeds of its own destruction.

Another interesting old engine of the 1930's was the 6 1, six cylinder M.A.N. used by the German Military during WWII; also described in the aforementioned SAE reference paper 2001-01-0271. This engine had what, on first sight, looks like a very-odd and ugly combustion system. Its operation, however, indicates that it was well thought-out to do the required military job at the time. This engine also used a throttling-pintle nozzle type injector; (its cone angle, if any, unknown). The injector was placed at a slightly-inclined angle in the cylinder head,; at the small (top) end of an odd inverted-funnel upward-extension of the chamber, what I call the "fuel funnel". While the long fuel funnel maintained the fuel plume discharged by the nozzle tip airborne during ignition and combustion, it also increased the chamber's S/V; and its heat losses. On the lower, larger-diameter side of the fuel funnel, close to the main chamber, a separate auxiliary air-cell was disposed; communicating with the fuel funnel through three small transfer passages. Between the piston and the fire-deck there was only a thin "bump clearance", with shallow valve-relief pockets, but with very-large surface area (and S/V). During compression, most of the air would fill both the fuel funnel and the auxiliary air-cell; after ignition, the air-cell, which no fuel entered, would cushion and dampen the rapid ROR and high $P_{max}$; then, later, the air in it would expand and exit to help evacuate the burning fuel and air out of the fuel funnel to; also, like the Lanova, provide an after-TDC combustion-acceleration mechanism for a quick end of combustion on the 2400 rpm engine (a fast speed, then). In spite of the extremely-high S/V ratio of the combustion chamber, the engines started extremely well; under any conditions, unaided by glow-plugs or any other means (which was why the German Military chose them over the competing Mercedes, which could not start cold at all without glow-plugs). That, in the 1930's, was an incredible accomplishment; especially since the relatively-small engine cylinders (105 mm bore×120 mm stroke; 1 l/cylinder), only had a $CR_n$ of 15.5:1. It is interesting that, today, DI engines of this size, with much-lower S/V than the M.A.N. engine; need a higher $CR_n$ to start cold; and many also use glow-plugs. What has surfaced is that the M.A.N engine; contrary to modern DI designs, used a very-early IVC, high $CR_e$ and TAM. If the long fuel-plume path inside the fuel funnel contributed to the incredible startability, this philosophy is also an integral part of my new combustion system. The M.A.N. engine, however, with the huge chamber S/V, lost a sizable portion of its compression and combustion energy to the cooling system, and, eventually, with reduced thermal efficiency, was also discarded. My proposed energy-cell solution does not incur the excessive thermal losses of the M.A.N. engine; to maintain a higher thermal efficiency without losing the effective ignition characteristics and smooth, quiet operation with low $CR_n$.

Whereas piston notches are a perfectly understood necessity to obtain valve overlap for the common reason of cooling the chamber, turbocharger, etc.; the need for overlap (and piston notches) in order to advance the IVC without shortening the open-valve duration; for increasing the $CR_e$, cannot be found in the literature. Even thus we have discovered that it has been used on many old engines: the literature does not indicate that the developers of those engines ever made the connection to improved startability; or quieter, smoother idle. In every case, the better startability or idle running was credited to some other engine feature, such as the chamber's, pre-chamber's, or energy-cell design, material or shape, or other injection characteristic; or the use of a starting system providing faster cranking speeds. The same situation occurs with the use of a later EVO for an improved expansion and exhaust process; when the true thermodynamic reasons are not understood. Although some obscure mention is occasionally made on the literature about the effects of a late EVO on increasing the effective expansion ratio ($ER_e$), it is never linked to the overlap and the need for notches. In addition, the new term for Trapped Air Mass (TAM), which I have used for the first time and introduced in the literature (see my aforementioned SAE paper 2001-01-0278 published on Mar. 5, 2001) specifically indicates its linkage to the IVC point, and the need for overlap and also earlier IVO, without losing valve duration period; as a pre-requisite for additional benefits on cold startability and smooth, quiet idles and low-speed running; based on reduced ignition-delay periods. Improved startability, smoother idle and low-speed running, plus increased low-speed torque, based on reduced ignition delay; and derived from higher $CR_e$ and TAM jointly increasing the Enthalpy of the compressed air just-before injection, and as defined in the SAE paper mentioned above, is a whole new Thermodynamic concept.

Since the early day of diesel engines, the piston rings were placed at safe distances from the top of the pistons, to keep them from running too hot under high load/speed conditions; in the poorly-lubricated area near the top of the cylinder. The poor quality of the piston, piston rings and cylinder (or liner) materials at the time resulted in high wear on all three. The low position of the ring-pack in relation to the piston top, and the reduced temperature therein, kept the rings from "sticking" with soot, and losing their sealing ability. This problem, on DI engines with Hesselman (mexican hat) pistons, was (still is) aggravated as combustion occurred in the larger toroidal volume of the bowl; near its periphery. Even improved pistons, rings and cylinder (or liner) materials, while improving the wear resistance, could not help move the rings to a higher position. Not that there was much interest to do so then; the deleterious effects of high headland clearances (from low-ring positions) had not been properly documented.

About 25 years ago, when the damaging effects of high headland clearance volumes were recognized, and acted upon by raising the ring pack, a new approach was taken to cool the area. This approach, called "top-liner cooling", feeds water to the top of the liner, at its mounting flange; and works very-well to allow the raised "headland" rings. This approach has not been universally accepted; instead, interior cooling of the piston's ring-band area (cooling galleries) is used; with engine oil and various mechanisms to carry the oil to the high place on the piston undercrown. The approach increases the cost of the pistons; still, fails to allow "headland" rings. The ring-temperature dilemma is aggravated, on DI diesels, by the fact that the upper lip of the combustion bowl is only a short radial distance inboard from the cylinder diameter; and because the design of the piston crown does not allow the cooling galleries to reach high-enough to permit the "headland rings"; further increasing the heat transfer to them and raising their temperature. This situation cannot be helped by better piston-ring gallery-cooling systems; not when the problem is the antiquated combustion system generating far too-much heat in the upper peripheral areas of the pistons.

On current DI engines, it is the convention to include a squish-area; formed between the periphery of the piston crown and the fire-deck, to generate squish turbulence in the chamber and increase the in-bowl swirl to accelerate combustion process. This was a fine idea thirty years ago, when injection started early to accommodate the long duration of the injection period; then caused by ancient low-pressure injection systems. Those systems were characterized by combustion-initiation taking place much-before TDC; to avoid combustion termination being very-late, because this reduced the power output and increased the fuel consumption and smoke. Today, when high-pressure, short-duration injection systems initiate injection and combustion at, or near, TDC; the use of swirl is already obsolete, as squish-and-swirl turbulence, generated about one engine revolution earlier than combustion, are largely ineffective after TDC; and energy is saved by not generating them. Our new combustion system discards this old swirl approach, and uses new accelerating mechanisms to produce a late, but fast combustion process.

Today, there are two different approaches to designing the relative position of the valve head in relation to the cylinder head fire-deck, the combustion chamber, and the piston itself; these approaches result from the different preferences of the engine designers themselves. Some designers prefer to have the entire valve head, on each valve, protruding below the head's fire-deck. The advantage of this design is that air-flow starts into the cylinder immediately after the intake valve(s) starts to open; or the exhaust-gas flow begins evacuating the cylinder immediately after the exhaust valve(s) begins to open. The same effect takes place as the valves close; air or gas flow continues uninterrupted until the valves effectively close by seating. This design reduces the pumping losses and makes for a more-efficient thermodynamic cycle. One disadvantage is that, during the many overhauls and repairs that heavy-duty engines are required to endure, and while manhandling the cylinder heads; the valve-heads, protruding below the fire-deck, may get damaged. Another disadvantage is that, to provide "bump" clearance between the valve head and the piston, piston notches are necessary; and, apart from interfering with the air-swirl motion required by today's modern DI engines, machining the notches cost money.

Some engine designers, however, prefer to totally recess the valve heads into the fire-deck of the cylinder head; to avoid the need of forming notches on the piston top (because they interfere with the air swirl), as well as the possibility of damaging the valve heads during overhauls or repairs. Under these conditions, however, flow through the valves, in or out of the cylinders, is shrouded by the encirclement of the valve head(s) inside the recesses on the cylinder head's fire-deck.

One premise of this invention is that, if current large diesel engines used very-small tip-discharge orifices, they would have much better startability and idle operation, with less noise, fuel consumption and $NO_x$; as explained in the aforementioned SAE Paper 2001-01-0278. Currently, tip-discharge orifices about 0.25–0.3 mm are used by industrial and truck-type DI engines. Smaller holes, about 0.14–0.18 mm have been successfully-used on very-small passenger-car DI engines; but only with low-Sulphur European fuels. These smaller orifices; smaller than the Pintaux single auxiliary-spray hole of 1939, have not shown the same coking tendencies of the Pintaux; because they work on the always-leaner, cleaner, cooler environment of the DI chamber. As the smaller nozzle-tip discharge holes improve the startability, if they were used on larger truck engines, the high $CR_N$ in-use today would not be required, and the engines would run with lower $P_{max}$; reducing the BSFC and $BSNO_X$. The problem, though, is that with all-small holes, the hypothetical new nozzle would lack discharge capacity to carry full-load fuel. This application shows how this new problem is solved by new variable-flow tips that restrict the early fuel-flow; to produce smooth, quiet starts; but which then open to full flow to allow the engine to carry full-load. This is what throttling-pintle nozzles have been doing for almost 75 years on Divided-Chamber engines. Such tips, however, because they discharge along their main axis (which with multi-valve engines is also the main cylinder axis), cannot be used on shallow-bowl DI engines, which need multiple discharge orifices with large included angles of 140° or more.

SUMMARY OF THE INVENTION

Accordingly, the present invention proposes a new form of divided-chamber type energy-cell combustion system in which the majority of the combustion process takes place in the main (open) chamber; the energy-cell only serving as a late combustion-acceleration mechanism. The energy-cell is centrally-disposed on the bottom of a piston's deep bowl; with multiple intake and exhaust valves in the cylinder head, along with a new type of injection nozzle. It is the object of this design to completely-change the engine's thermodynamic cycle by using lower nominal (or design) compression ratios ($CR_n$) than those used on current DI diesel engines of similar displacement; yet, achieving improved startability, increased power output, lower fuel consumption, emissions, smoke, noise, ROR, $P_{max}$, and reduced thermal and mechanical loads; all based on a new valve-timing and air-cycle philosophy. Broadly stated, in a preferred configuration piston notches are provided to avoid the valves from hitting the piston while producing large overlap periods near TDC; to allow the proper valve timing and air-cycle; with earlier intake valve/later exhaust valve events than are typical on today's engines of similar displacement. The energy-cell has one main central transfer passage and a plurality of auxiliary transfer passages to allow fluid communication between its interior and the main combustion chamber. The system uses a new type of injector, centered in the cylinder head substantially along the main axis of the cylinder, which combines a main discharge passage, preferably of the throttling-pintle type, and a plurality of small auxiliary discharge orifices, angled away from the main axial pintle discharge, but at much-narrower included angles than those used on today's DI engines of similar displacement. The initial injection of small fuel plumes by the throttling-pintle and the auxiliary-discharge orifices on the nozzle tip assure fast, smooth, quiet and clean ignition of the fuel in the main chamber, as well as improved startability; especially with the high $CR_e$ and TAM achieved with an IVC earlier than on today's typical DI engines of similar displacement. The increased fuel-flow by the later fuel discharge from the throttling pintle orifice transfers some of the raw and burning fuel into the energy-cell through its central transfer passage. During this later stage of injection, the piston and energy-cell are moving away from the nozzle tip, and the central-discharge plume, typically in a hollow-cone shape and forced to a longer path increasingly misses the energy-cell's central transfer passage; automatically limiting the fuel quantity entering it. Thus, only a portion of the fuel is burned in the energy cell and later discharged back to the main-chamber to accelerate its combustion process during the expansion stroke; and energy is not wasted in generating swirl in the entire air mass admitted into the cylinder by the long, tortuous helical swirl ports; as it happens with conventional DI engines.

More specifically, the combustion system according to the present invention forms part of an internal combustion engine having a cylinder bore with a piston located in the bore for reciprocal movement therein. A cylinder head is fixed over the cylinder bore and piston to cap the opening of the cylinder bore and form a combustion chamber with one or more intake passages extending in the cylinder head through which air flow is controlled by two or more intake valves located in the intake passage(s). Similarly, one or more exhaust passages are formed in the cylinder head and one or more exhaust valves are located in the passage(s) for controlling the exhaust-gas flow from the combustion chamber. A new type of hybrid injector, discharging both through a central throttling-pintle orifice and a plurality of peripheral orifices is also disposed in the cylinder head; substantially central to it, with its central axial pintle orifice substantially in alignment with the main transfer passage of the energy-cell.

Accordingly, one purpose of this new and advanced combustion system is to achieve the maximum possible air throughput, for maximum power output with lower fuel consumption and emissions, and to lower the cycle temperatures, especially the Exhaust-Gas Temperature; achieved by using a sizeable amount of overlap.

Another purpose of this invention is to allow an increase of the effective compression ratio ($CR_e$) to compensate for the reduction of the nominal compression ratio ($CR_n$); yet to achieve improved startability; smoother, quieter idle and acceleration; and increased torque levels with lower smoke, fuel consumption and emissions than current DI engines of similar displacement.

Another further purpose of this new and advanced combustion system is to increase the mass of air trapped in the cylinder (TAM), especially during cranking and at low speeds; to increase the Enthalpy of the TAM at the start of injection. and to reduce the ignition delay of the fuel. These improved parameters will further enhance the startability even with lower $CR_n$; to lower the combustion noise and increase the torque while reducing the fuel consumption, smoke and emissions; especially at low speeds.

A further purpose of this new invention is to provide valve-relief piston notches, deeper than what are used today on typical DI engines of similar displacement; to eliminate the possibility of the piston interfering with the valves motion during the overlap period; such depths enough to allow the early intake/later exhaust events (especially early IVC and late EVO) with the required increased overlap, than what is found on today's competitive DI engines of similar displacement.

Another purpose of this new and advanced combustion system is to achieve faster combustion, late in the expansion stroke, without the use of intake-port induced swirl as a means of accelerating the combustion process.

A further purpose of this new and advanced combustion system is to use a semi-open chamber, where a majority of the combustion takes place; to reduce the pumping and heat-transfer losses typically associated with large, high S/V auxiliary-combustion chambers.

Another further purpose of this new and advanced combustion system is to use a small energy-cell to act as an accelerator for the main-chamber combustion process late during the expansion stroke of the engine cycle.

Another further purpose of this new and advanced semi-open energy-cell combustion system is to dispose the energy-cell substantially at the center and bottom of the piston's bowl.

A further purpose of this new and advanced semi-open energy-cell combustion system is to cap the cell at the top; included in the cap are a plurality of transfer passages providing fluid communication between the inside of the energy-cell and the main combustion chamber.

A yet further purpose of this new and advanced semi-open energy-cell combustion system is to have, in the cell's cap, a central transfer passage; essentially aligned with the main injection-plume of the injector placed in the cylinder head, so as to receive some of the fuel included in the main fuel-plume; and to burn this small amount of fuel inside the Energy-Cell.

It is yet a further purpose of this new and advanced semi-open energy-cell combustion system to have a plurality of auxiliary transfer passages on the cap of the energy-cell, surrounding the main chamber and communicating the inside of the energy-cell with the main combustion-chamber; the first purpose of the passages to admit air into the energy-cell, during the compression process.

Is yet another further purpose of the energy-cell in this new and advanced energy-cell combustion system to generate internal swirl in the energy-cell by inclining the auxiliary transfer passages in relation to the centerline of the Energy-Cell; to accelerate the combustion process therein.

It is yet a further purpose of the energy-cell of this new and advanced combustion system to, after combustion starts in the energy-cell, control the rate of fuel injected into it; first, through the main transfer passage, directly by refluxing the products of energy-cell combustion against the remaining main-injection plume still intending to enter the energy-cell; so as to break it-up and push-it back into the main chamber, away from the energy-cell; to complete its combustion process with the majority of the fresh air found in the main combustion chamber.

It is yet a further purpose of the energy-cell in this new and advanced combustion system to further reduce the entry of fuel into the energy-cell by increasing the distance; during the expansion stroke, between the injector and the cell's main transfer passage as the piston moves away from TDC.

It is yet a further purpose of the energy-cell in this new and advanced combustion system to discharge the products of energy-cell combustion back to the main combustion chamber also through the slanted auxiliary transfer-passages, and to spread them out, away from the cell and towards the periphery of the main chamber, to accelerate the combustion process therein, where a large portion of the air, once located at the main central bowl while the piston was at Top Dead Center (TDC), migrates after the piston starts moving away from TDC during the expansion process.

It is yet another purpose of this new and advanced semi-open energy-cell combustion system for the injector in the cylinder head to be essentially aligned with the cell's main transfer passage; the injector fitted with a throttling-pintle nozzle tip to reduce its flow during the early injection period; then, with increased flow after the pintle ceases throttling, inject the main fuel-plume so that a portion of it enters the energy-cell; all to achieve a quick and smooth initiation of combustion followed by charging the energy-cell with fuel to proceed with the overall combustion-acceleration process.

It is a further purpose for the nozzle tip of this new and advanced semi-open energy-cell combustion system to be disposed with a plurality of very-small auxiliary discharge orifices, to spray a small amount of finely-atomized fuel in directions angled away from the main discharge plume; such sprays also to initiate multiple small points of ignition in the main chamber; so as to allow a very-late but fast combustion process therein and to continue injecting fuel during the whole injection-period duration, such late-injected fuel acting as an additional accelerator for the late main-chamber combustion process.

An additional further purpose of this new and improved combustion system is to, using centralized, not peripheral combustion, reduce the heat-transfer to the ring-band area of the piston; and to allow the easy cooling of the area with simple, traditional oil-squirting mechanisms so as to minimize the headland clearance by using high ring-packages.

It is the ultimate purpose of this new and improved semi-open energy-cell combustion system to operate more as a Constant-Pressure Combustion Process than a Constant-Volume Combustion Process; so as to limit the Cylinder Firing Pressure ($P_{max}$) and the Rate of Pressure Rise (ROR), to accept a higher air-charge and produce higher power with reduced Mechanical and Thermal Loads; yet, achieving lower fuel consumption and emissions.

BRIEF DESCRIPTIONS OF THE DRAWINGS

Other objects, advantages and features of the present invention will become apparent from the following detailed description of the invention when taken in conjunction with the following drawings in which.

DETAILED DESCRIPTION OF THE FIGURES

Figure 1:
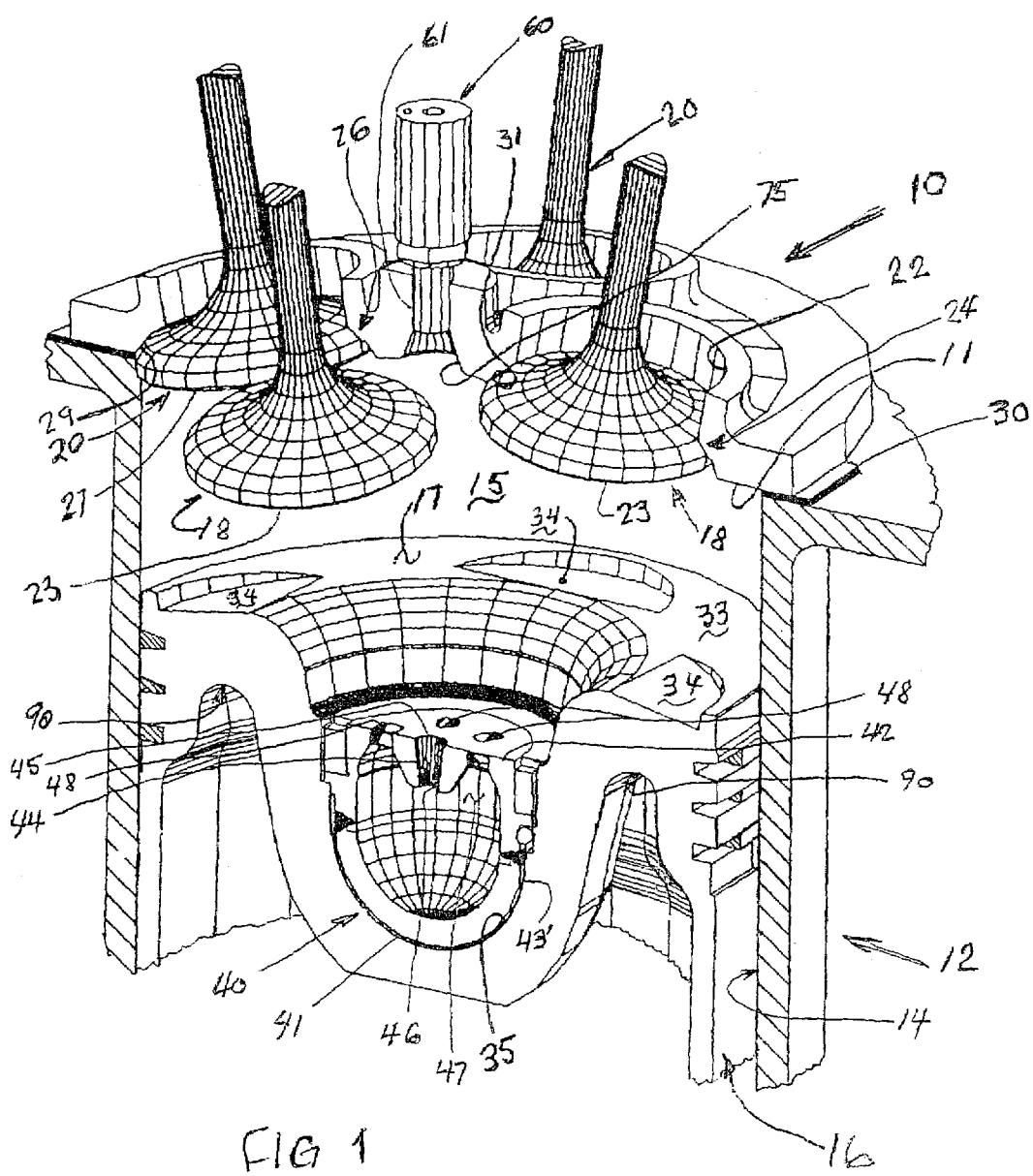
FIG. 1 is a segmented side elevational view of a cylinder and piston assembly, with the lower portion of the cylinder head, and with some elements cut-away; for a divided-chamber diesel engine illustrating one embodiment of the present invention.
Figure 2:
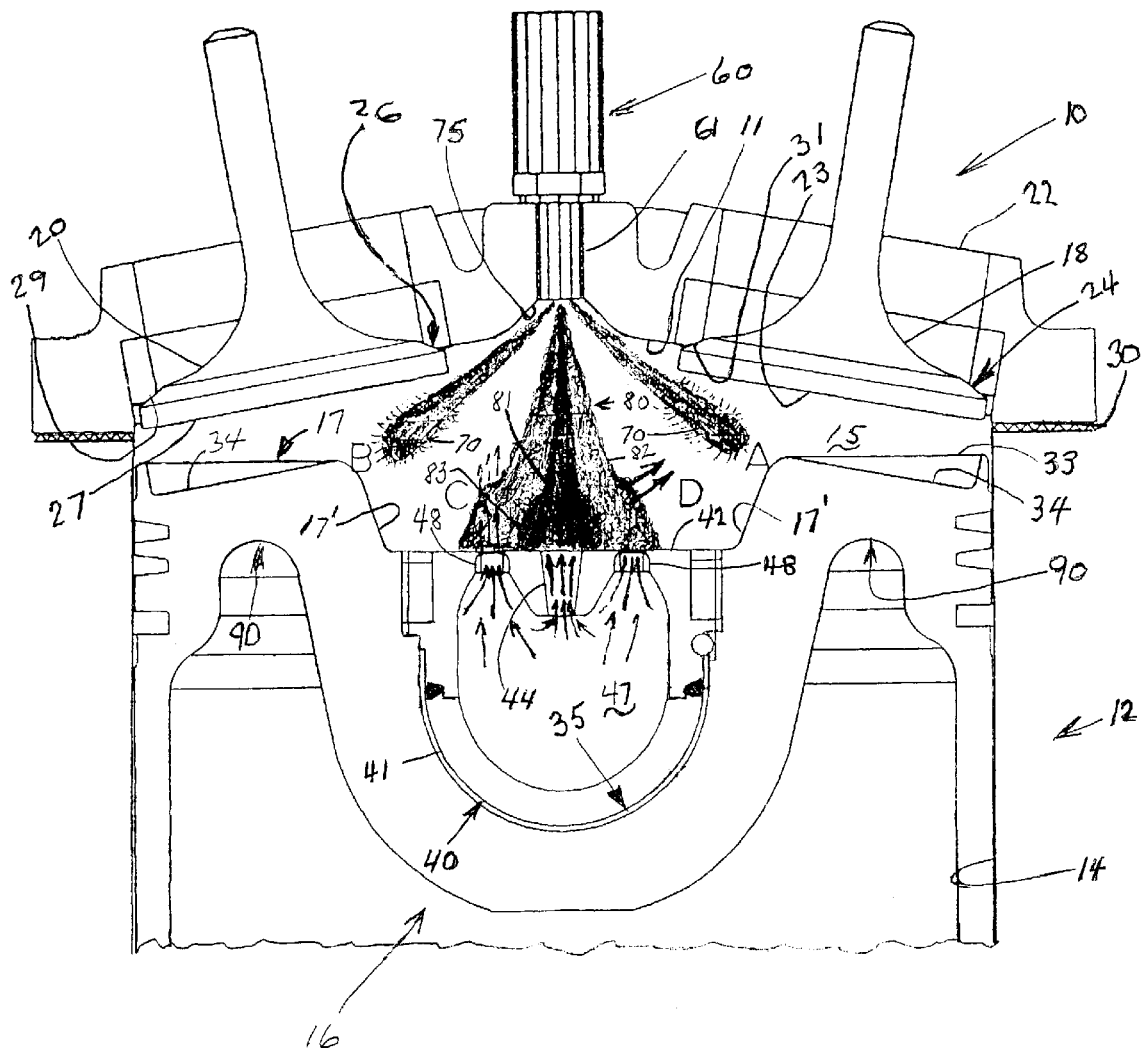
FIG. 2 is an elevational cross-section of the combustion system showing a visualization of how the combustion process progresses.

Referring now to the drawings and more particularly to FIGS. 1 and 2 thereof; a cylinder head 10 and an engine block 12 of a single or multi-cylinder diesel engine are shown provided with a cylinder 14 and a piston 16. Although only one cylinder 14 and piston 16 are shown, it should be understood that any other cylinders and pistons of the engine are substantially identical in structure and function. The cylinder head 10 is conventionally attached to the engine block 10 by fasteners (not shown). Although not shown, each piston is conventionally connected to a crankshaft which, in turn, is connected via a valve-timing mechanism to a camshaft that serves to time the opening and closing (as will be explained hereinafter) of one or more exhaust valves and a plurality of intake valves located in the cylinder head 10. Only the top portion of the piston 16, above the piston-pin (not shown), is shown for simplicity.

The cylinder 14, piston 16, and cylinder head 10 form a main combustion chamber 15 with the top surface 17 of the piston 16 serving as the bottom wall of a combustion chamber 15 while the opposed bottom surface 11 (the "fire deck") of the cylinder head 10 forms the top wall and the cylinder 14 per se forms the side-wall of the main combustion chamber 15 as the piston 16 moves downward from its top dead center (TDC) position.

The cylinder head 10 is, in this case, provided with two intake valves 18 and two exhaust valves 20 (only one of each shown in FIG. 2). The intake valves 18 are located at the end of intake ports 22 (only part of the last portion of one is shown in both FIGS. 1 and 2), which terminate one end with an annular intake passage 24 (only one shown, closed) formed between the valve head portions 23 of the intake valves 18 and the valve seat portions 31 formed on the cylinder head 10, and are adapted to be closed by the valve head portions 23 of the intake valves 18. The annular exhaust passages 26 (only one shown, closed, in both FIGS. 1 and 2) are formed between the valve head portions 27 (only one shown in both FIGS. 1 and 2) of the exhaust valves 20 and the valve seat portions 29 formed in the cylinder head; and are adapted to be closed (as shown) by the valve head portions 27 of the exhaust valves 20. A conventional gasket 30 or other typical sealing mean is interposed between the cylinder head 10 and the engine block 12 with circular cut-outs aligned over the cylinder 14.

As seen in the Figures, the piston 16 has a top surface portion 17 comprised of an outer periphery 33. While this periphery typically is substantially flat, to form a "squish area" against the first bottom surface 11 (the fire-deck) of the cylinder head; preferably it also has, formed in it, deep valve-relief piston pockets (also called notches) 34, to allow the valves to open and "cross" during overlap, without touching the piston. This (and the elimination of swirl), are two of the basic philosophical pillars of the new combustion system. The requirement for notches 34 is derived from the fact that this combustion system is optimized by featuring earlier intake valve events and later exhaust valve events than current conventional diesel engines of similar displacement; and, so as not to reduce the open duration of the valve periods, "earlier" intake valve events including earlier opening timing; far ahead of TDC, and "later" exhaust valve events including exhaust-valve closing timings well-past TDC are necessary; both resulting in large overlap periods for a highly-improved air cycle which also includes "earlier" IVC and "later" EVO than current diesel engines of similar displacement. This case is well explained in my already-referenced SAE Paper 2001-01-0271.

Piston 16 has, in its center, a deep bowl 35, inside of which is disposed an Energy-Cell 40, preferably formed of two parts. The lower portion 41 of the Energy-Cell 40 is preferably formed as a hemisphere. The top portion or cap 42 of the Energy-Cell 40 is conventionally attached, by welding or other mechanical means, to the lower portion 41; both are then secured by conventional means to the deep bowl 35 of the piston 16. On the cap 42 is formed the main transfer-passage 44; preferably tapered with the large open-end 45 facing the main chamber 15; and the small open end 46 facing the inside volume 47 of the Energy-Cell 40. The axis of the main transfer passage 44 is preferably the same as the main axis of the cylinder 14 and piston 16.

FIGS. 1 and 2 also show a gap 43' formed between a large part of the periphery of the Energy-Cell and the cavity 35 of the piston 16, for the purpose of insulating the energy-cell; reduced the heat losses and the possibility of piston over-temperatures in the areas where the two run close together.

Figure 3:
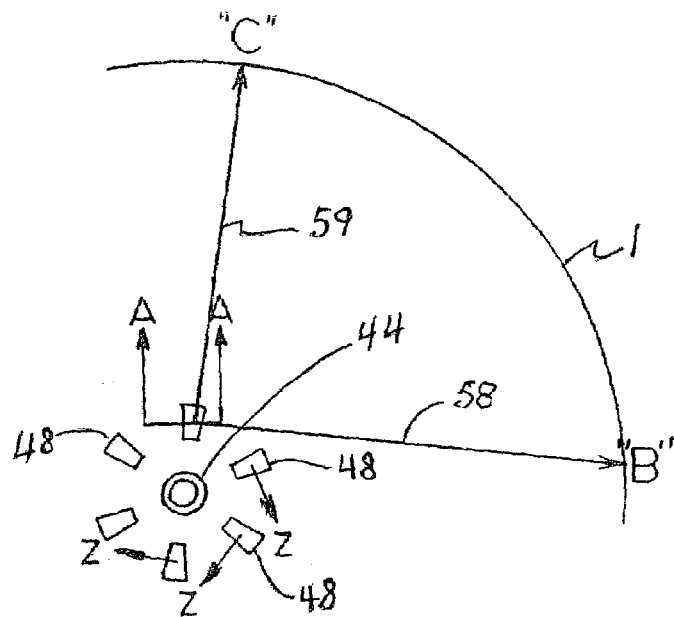
FIG. 3 is a top plan view of portion of the Energy-Cell cap in relation to the cylinder diameter, showing the disposition of the transfer passages.

FIG. 3 shows a top view of the main transfer passage 44 and the auxiliary transfer passages 48 on the cap 42 atop the Energy-Cell 40; in respect to the cylinder bore partially shown by circular line 14. The plurality of auxiliary transfer passages 48 is preferably disposed in a circle surrounding the main transfer passage 44; and inclined with respect to the vertical plane, as shown by section "A—A". Transfer passages 48 are preferably formed with rectangular cross-section with rounded corners, as shown in FIGS. 1 and 2; other configurations, such as a truncated-cone cross-sections, are possible; as shown in FIG. 3. FIG. 3 also shows one unique characteristic of this design, in which the transfer passages are placed to discharge along line 58 to point "B" in the cylinder 14; tangentially to the axial centerline 44 of the energy-cell. This is new, as the earlier 1929 ACRO energy-cell by Lang only had one transfer passage. Other somewhat similar arrangements with multiple discharge passages, in prechambers (not energy-cells, which never had more than one transfer passage), always discharged in the radial direction; depicted in FIG. 3 as line 59 discharging to point "C" on cylinder 14. The uniqueness of these new design is that, not only do the auxiliary transfer passages generate internal swirl of the air compressed into the Energy-Cell during the cylinder's compression stroke, but that, upon discharge of the products of Energy-Cell combustion; the distance to point "B" is longer than the distance to point "C" (in this case by 19%); therefore allowing the discharge extra free-plume path-length before reaching the cylinder wall or outside piston dam (squish band, on DI engines). This allows the plume extra distance (and time) to burn while airborne and lose less heat than by impinging against the colder metal walls of the cylinder and/or piston; as would be the case with a pure radial discharge (as per line 59 to point "C"). Obviously, the airbourne combustion of the extra-long fuel plume is more efficient, and generates less smoke and PM, than that of the shorter plume impinging on metal which is always colder than the air in the main chamber.

Figure 4:
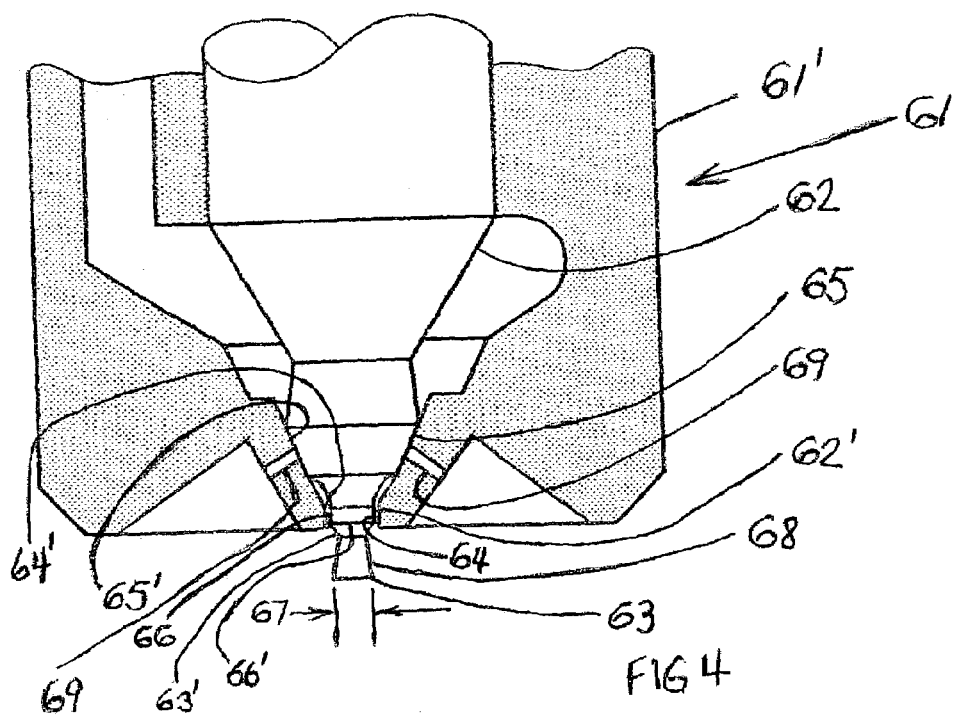
FIG. 4 is a cross-section of one embodiment of the new injection tip.

FIG. 4 shows the lower section of a new type of injector nozzle tip 61 complementary to the Energy-Cell to work as intended. Located substantially centered in the cylinder head (not shown) along the main axis of the cylinder and piston (also both not shown), is placed an injector (not shown), with nozzle tip 61. Nozzle tip 61 is of a new type, which can be partially based on the conventional pintle tips used on Divided-Chamber engines, as disclosed and discussed in my SAE paper 2001-01-0278of reference. Essentially, tip 61 is defined, on the one hand, by a conventional centrally-located throttling-pintle 62', formed at the operating-end of the needle 62; a design used since 1928. This particular type of nozzle tip, opening inwardly by hydraulic action, has a needle-tip extension 63 protruding through a discharge orifice 64. Flow is opened and closed by the action of a conical seat 65 in the needle 62; and seat 65' formed in the body 61' of the tip 61. The pintle has two diameters; its upper diameter, of constant cross-section (the "obturator") 66, is larger than the maximum lower diameter 67 of the needle-tip extension 63. During the initial portion of the needle (and pintle's) lift, the diameter of the obturator 66 maintains a constant precision-controlled clearance with the orifice 64 in the body 61' of the tip 61. This "throttling" reduces the initial fuel flow through the obturator-controlled orifice; during the early phase of the needle's lift. On a well-designed fuel and combustion system, the throttling action continues until past the point when the fuel ignites, so as to achieve ignition with the minimum of fuel present and with the minimum of Enthalpy of the compressed air lost to the fuel in the form of heat of evaporation. The combination of the higher air Enthalpy and the minimum amount of fuel present guarantee the highest temperature available to ignite the fuel, and its fastest ignition with minimum delay. This reduces the combustion noise (Diesel Knock), and the amount of $NO_x$ generated, as the amount of fuel igniting simultaneously at the end of the delay period is the minimum possible. As the needle 62 lifts further, the engagement length between the obturator 66 and the orifice 64 is reduced; this reduces the resistance to flow and slightly increases the flow. The throttling portion of the injection cycle during which the obturator 66 is engaged with the orifice 64 is called the "overlap" (or throttling period), and it can amount to between 35% and 70% of the total lift of the needle. The total overlap duration is designed to match the delay time of the fuel on any particular engine; so at the end of the delay, when the fuel auto-ignites, the minimum possible amount of fuel has been injected; only enough to achieve positive auto-ignition of the fuel (that is, without quenching and extinguishing the flame kernel). The fuel injected during the delay period should not be in excess; to avoid too-much of it auto-igniting all at once and producing excessive noise, ROR and $NO_x$. At the end of overlap period, the lower edge 66' of the obturator 66 is lifted beyond the upper-edge 64' of the discharge orifice 64; thereafter the smaller upper diameter of the needle tip extension, and its tapered shape 63'; control the clearance to the orifice 64; and a larger amount of fuel flows to allow the engine to carry its maximum load. Additionally, the end of the pintle can be formed as a reverse cone 68; with included angles usually under 20°, to produce a hollow-conical fuel-spray which is easy to break-up, mix with the air and burn for quicker combustion. All of these diameters, pintle lengths, cone angle, overlap, etc., typically are engine-specific. This is all also old technology, dating back to 1928.

FIGS. 2 and 4 show the second unique characteristic of the new tips 61; which constitutes the basis of this application. That is the plurality of auxiliary spray holes 69 (only two shown) of very-small diameter; with flow areas only a fraction of what conventional hole-type nozzle tips use on conventional current DI engines of similar displacement. In this regard, tips 61 also have some characteristics typical of both the old Pintaux tips, and the new multi-hole VCO (Valve Cover Orifice) now extensively used on DI engines. The old Pintaux tips carried one large auxiliary spray hole, and it was used for a totally-different purpose (at which it failed, as already explained). As on the new multi-hole VCO tips for DI engines, a plurality of discharge orifices are circularly disposed to inject directly into the main chamber; these orifices, however, are of much-smaller diameter than those on current DI engines of similar displacement.

With the VCO feature, the discharge orifices are directly closed by the tapered seat 65 of the needle 62. With this design, the tips do not suffer the emissions and fuel consumption penalties of earlier designs, in which the discharge orifices were fed from the "sac" below the valve-seat. Older tips using the "sac" volume, always, at the end on injection, dribbled a certain amount of fuel as large droplets. Such large droplets, which were hard to break-up and mix with the air, entered the chamber too-late during the expansion stroke, when most of the oxygen in the chamber was already consumed. They did not burn well, and exited the chamber as smoke and soot, also increasing the fuel consumption. Whereas the normal multi-hole VCO tips used today on conventional DI engines, with larger discharge orifices, inject all the fuel necessary for combustion; with the new tip subject of this invention the auxiliary spray holes 69, being of much-smaller size, inject only a portion of the total amount of fuel. This supplemental fuel complements that injected by the main-plume from the throttling-pintle needle 68.

Another difference between the new tip subject of this invention and common multi-hole tips is that, on the new tip, the cone angle between the centerlines of the auxiliary orifices 69 and the tip centerline is much-smaller than with conventional multi-hole tips by typically 25° to 35°. The function of the auxiliary spray holes 69, as shown by the plumes 70 in FIG. 2, is to discharge a plurality of very-small sprays (only two shown) into the main chamber 15. The easily broken-up and ignited sprays 70 are also intended to reduce the delay time for faster ignition, as the amount of fuel in each of them is much-smaller than what is common with the large sprays on current conventional tips used on DI engines of similar displacement. In this fashion, a plurality of mild "kindling" spots is provided quickly; to start combustion in many places within the main chamber 15 and allow the late injection, but yet, fast and clean combustion, with minimum emissions and reduced fuel consumption.

The auxiliary sprays 70, in this case, having been discharged by very-small orifices into a large cylinder bore, have a larger ratio of free-flow path length to discharge orifice diameter (FFPL/DOD) than either the similarly-sized sprays on the small-bore automotive DI diesel engines or the larger sprays on the larger bore DI diesels. Therefore, the new combustion system subject of this invention, with the larger FFPL/DOD, does not suffer the same problems of fuel impingement on the colder piston or cylinder walls of either the current small or large DI engines. Impingement, by hampering and slowing down the mixing and combustion process, can increase the production of $NO_x$ and PM. $NO_x$ can be increased because, to compensate for the slower inefficient burning off the walls, the injection timing requires further advance. Impingement, also, especially with the extra-advanced injection timing necessary to compensate for the longer-duration burn that it creates; increases the production of PM. Thus, by allowing for a later injection timing, and by burning the tiny fuel plumes while they are airborne, the new system subject of this invention can offer faster, more-complete combustion and lower fuel consumption; plus additional reductions of both $NO_x$ and PM pollutants.

After the needle 62 lifts enough to end the "throttling period", and with fuel flowing through the annular orifice formed between the pintle needle extension 63 and the main-discharge hole 64 at its full capacity; the total injection period is reduced; and the main fuel plume, stopped by the combination of the piston moving away from TDC (and from the nozzle tip), plus the reflux of products of energy-cell combustion existing through the energy-cell main transfer passage, is forced to burn in the main chamber. This period of secondary combustion creates an expansion wave that follows the downward-moving piston, but which also expands radially towards the periphery of the piston, where a portion of the air once centrally-located when the piston was previously at TDC, is migrating. This period of combustion ends with the peripheral burn of the final portions of air and fuel remaining in the chamber and, contrary to conventional DI combustion, burns with lower temperature. The reduction of the upper-peripheral piston temperature allows the piston rings to run cooler, and to be moved upward to a "headland position", without sticking or being damaged by high temperature; for improved combustion efficiency and lower emissions.

Figure 5:
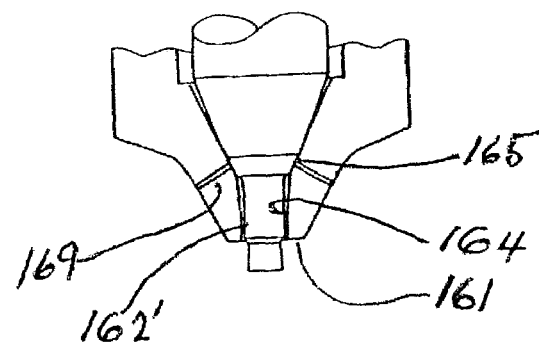
FIG. 5 is a cross-section of a second embodiment of the new injection tip.

FIG. 5 shows a nozzle tip functionally similar to the one shown in FIG. 4; at least as far as the unique characteristics of the invention; but differing only in that the modifications are based on a nozzle previously designed to serve only on DI engines; in this case, with the VCO characteristic also included. With this type of multi-hole nozzle tip for DI engines, featuring the larger-diameter pressure chamber (not shown) at a higher point in the body (where the large diameter does not affect the nozzle's installation), the nozzles can have a smaller shank diameter at the tip; for easier installation on the cylinder head and reduced exposure to the chamber's temperature, to reduce the possibility of coking the discharge orifices and/or overheating the needle tip and losing its hardness. These nozzle tips, as other for DI engines, have a protuberance 161 at the very tip, in which the multi-hole discharge orifices are machined. With our modified design, the bottom protuberance 161 is cut flat to allow the formation of the main pintle-discharge hole 164 through which the pintle 162' operates. The VCO characteristic is shown by the conical needle seat 165 directly closing the auxiliary spray orifices 169.

Figure 6:
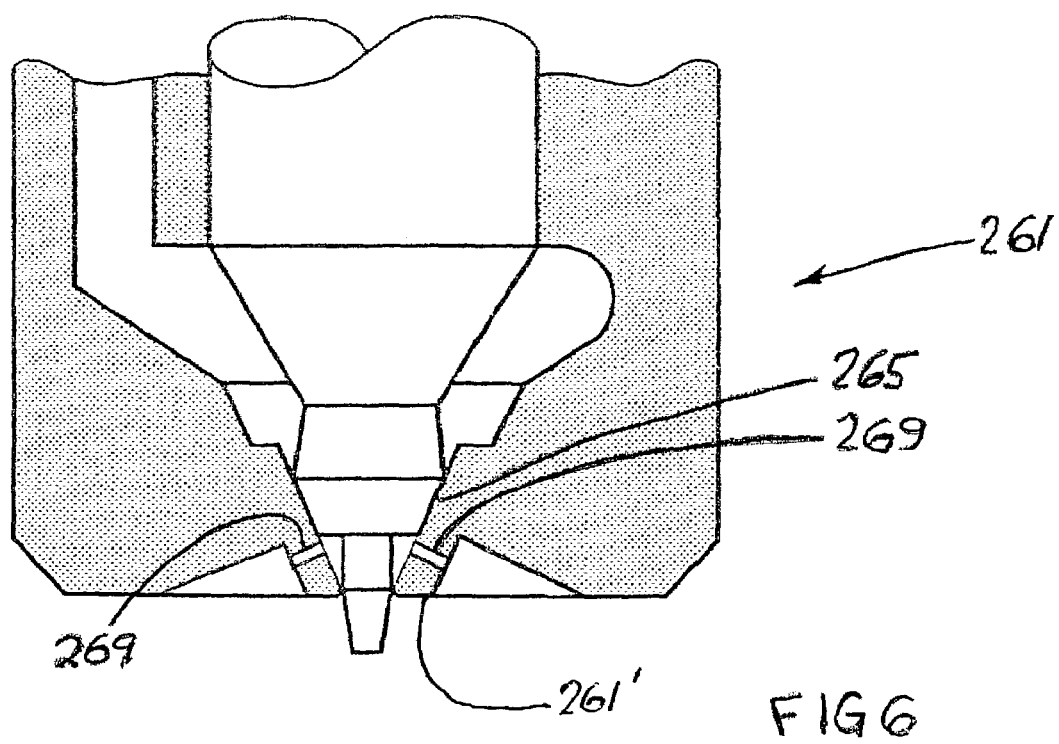
FIG. 6 is a cross-section of another embodiment of the new injector tip.

FIG. 6 shows another variation of the new throttling-pintle hybrid nozzle tip 261. This new hybrid tip is also modified as per the teachings of this invention; but based on an older-type of throttling-pintle tip; as shown in FIG. 4. The new-design tip 261 is modified by machining new circularly-disposed small holes 269 (only two shown) at the bottom of the tip's shank 261'. These holes, however, are not closed by the seat of the needle, as in FIG. 4; instead, the holes are machined to discharge the fuel from the "sac" 278, below the needle's seat 265.

A new nozzle tip, following the teachings of this invention, can also be obtained by modifying an old-design multi-hole nozzle tip for DI engines, combining the features shown in FIGS. 4, 5, and 6; to obtain a new tip with both features of a central pintle and auxiliary orifices surrounding it, but with the old basic "sac" design.

Figure 7:
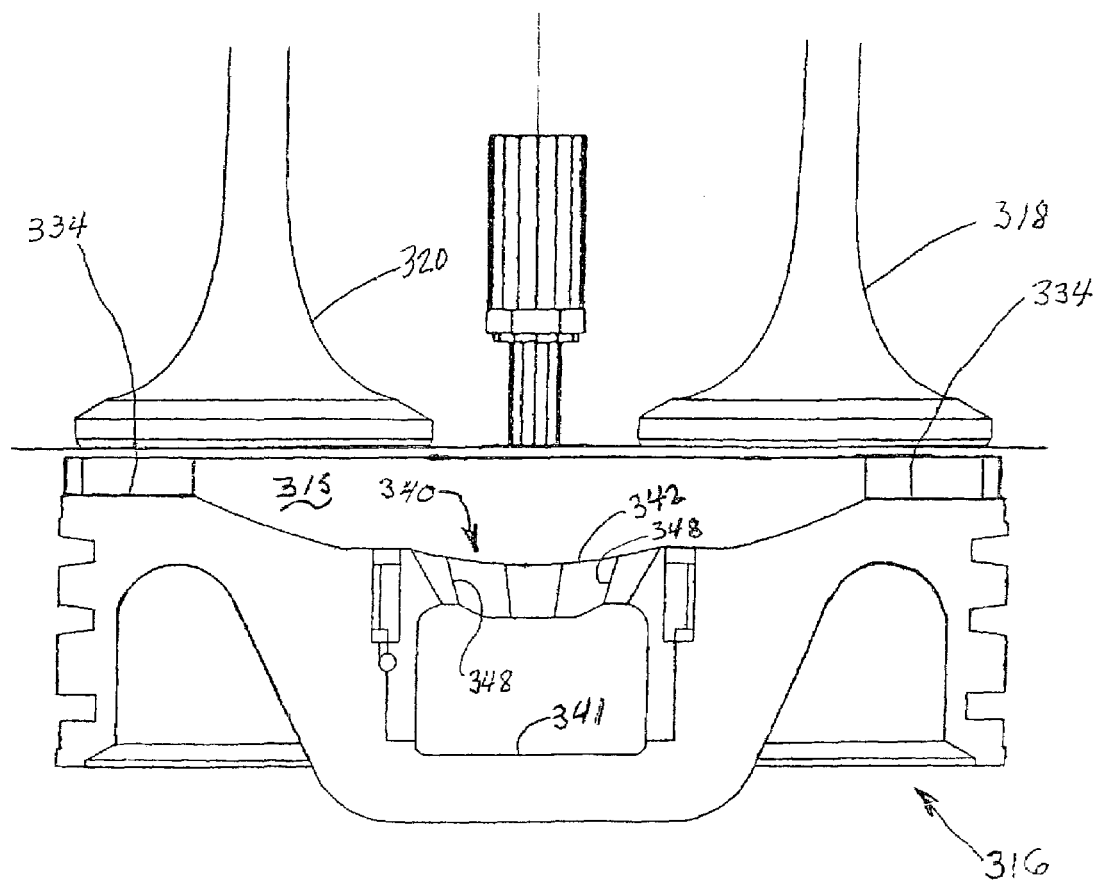
FIG. 7 is another embodiment of the combustion system.

FIG. 7 shows the new invention as applied to an engine cylinder using a current-design four-valve flat-deck cylinder head. This engine (not shown) is designed to operate with the valve-timing and air-cycle philosophy basic to this invention; requiring valve-relief piston pockets (or notches) 334 formed on the top of the piston 316 (including one in the center—not shown—for the valve disposed at the rear of the chamber—also not shown). Only one intake valve 318, and one exhaust valve 320; diagonally opposite to each other, are shown for simplicity. IN the energy-cell 340, another embodiment (of only two) of the auxiliary transfer passages 348 is shown, to indicate that anything in their design; related to size, hole configuration or angles is possible. IN this case, tapered passages 348 are shown aimed to discharge more into the periphery of the main chamber. Their centerlines may be straight with respect to the transversal plane of the engine (as shown; not recommended); or inclined, as is preferred in accordance with the teachings of this invention. The main chamber is formed with a compound shape including a hemispherical section of a bowl. The top portion 342 of the energy-cell 340 may also be formed as a hemispherical section; to gain additional volume in the main chamber and free-path length for the central fuel plume. Those are additional designer choices, fully contemplated within the scope of the invention. Passages 348 are formed in a circular conical shape, with the large open-end facing the main chamber 315, and the small open-end facing the interior of the energy-cell 340. In this case, the bottom part 341 of the energy-cell 340, rather than being formed as a preferred hemispherical cavity, is flat; another designer choice to accommodate the energy-cell within a piston with low-compression height.

Figure 8:
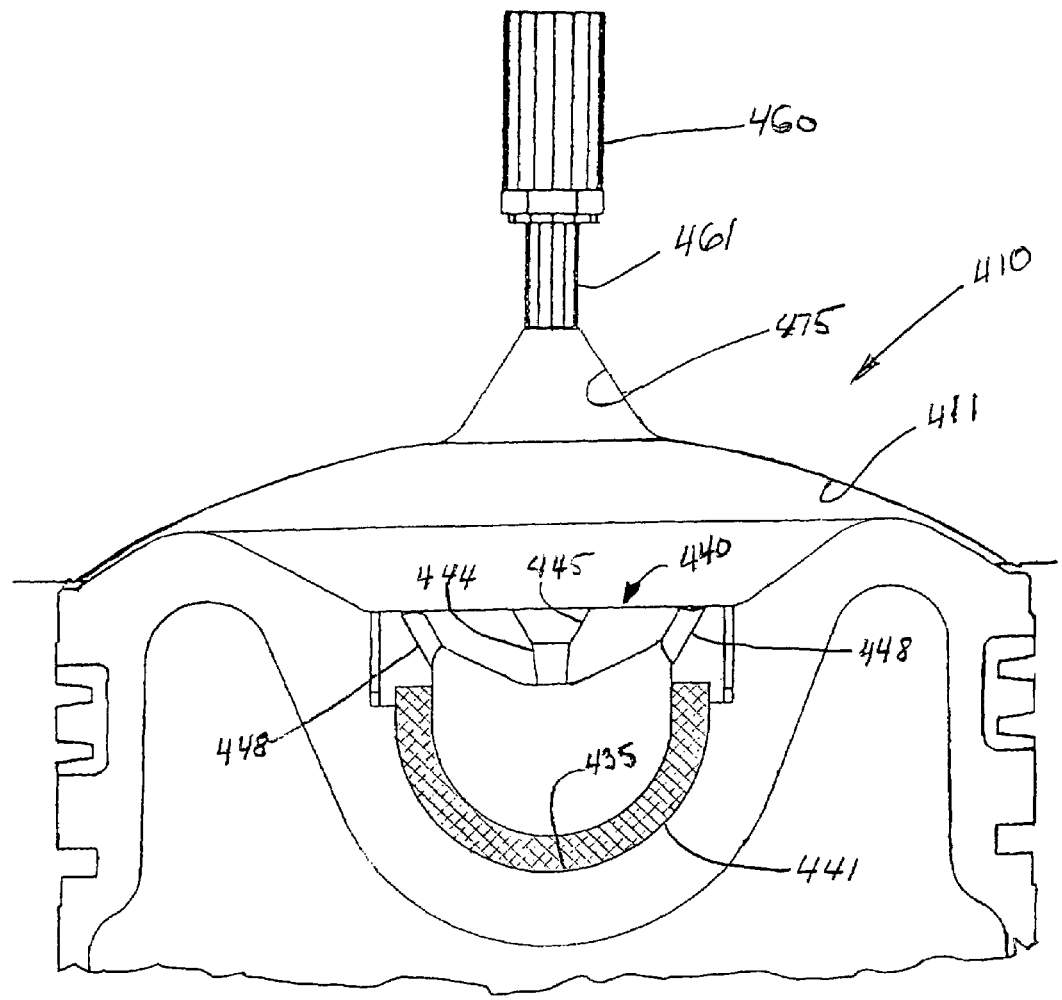
FIG. 8 is another embodiment of the combustion system.

FIG. 8 shows the invention applied to a valveless loop-scavenged two-cycle engine cylinder 410, utilizing the classical hemispherical combustion chamber fire-deck design typically used with this type of engines. The nozzle-tip 461 of injector 460 is disposed farther-away from the piston by inserting it at the top-end of a recess 475; so as to increase the free-plume path length to the energy-cell 440 and, thus, improve the fuel's ignition and easy combustion while still airborne in the main chamber. This is an important design element to control the amount of fuel entering the energy-cell 440; fuel which is burnt in the main chamber will not go raw into the energy-cell. The energy-cell's main transfer passage 444 is shown with a larger, wider funnel 445 on its upper side facing the main chamber; also another designer's choice. The auxiliary transfer passages 448 are also shown with a circular configuration; again another designer's choice. The lower part 441 of the energy-cell 440 is formed out of ceramic material for the ultimate insulation value.

In operation the new energy-cell combustion system starts the combustion cycle with the intake valve opening (IVO) being far-earlier than is currently used for most DI diesel engines of similar displacement (thus the need for the intake-valve piston notches). The earlier IVO, still with the exhaust valve open (extended overlap; later EVC) and while discharging the products of combustion from the prior cycle, scavenges the cylinder of the previous cycle's residual, blowing fresh air through the chamber and out through the exhaust valve, especially on modern turbocharged engines. This cools the chamber, exhaust valves and seats; and the turbocharger, to reduce their thermal stresses. The process, without the need for helical ports to induce cylinder swirl, reduces the heat gain of the air mass while travelling through the simpler, directed intake ports; and the larger volume of cooler air, with higher density, increases the air mass flow. As the intake air enters the cooler cylinder, it also enjoys a cooler reception into it, further lowering its temperature and increasing its density and mass; for higher power production with lower fuel consumption and emissions, especially $NO_x$. The exhaust valve closing (EVC) with this new combustion system; later than current practice with modern DI engines of similar sizes, is critical to the combustion system's proper functioning, as it ends the scavenging and chamber-cooling process far-later than on current similarly-sized DI engines; from that point on, the intake process continues with only the intake valve(s) being open.

The earlier intake-valve timing events allows the point of maximum intake valve lift to occur; typically, from approximately 10° to 30° C.A. earlier than with today's overlap-less conventional DI engines of similar size; thus advancing the whole intake-valve opening period and placing the point of maximum intake valve opening much-closer to the point of maximum piston speed. In turn, then, when the maximum vacuum is created in the cylinder by the maximum piston speed, the intake valves are offering their maximum opening and minimum flow-resistance; for a coordinated flow-path, with reduced pressure losses and maximum air mass intake.

The earlier intake-valve events also allow an earlier IVC than is found on today's conventional engines. During cranking, and at low engine speeds, the earlier IVC prevents loss of air from the cylinder to the intake manifold by backflow; thus saving some energy otherwise wasted in the flow of air in-and-out the cylinder, but; most importantly, traps a higher air mass (TAM) and also raises the $CR_e$. While cold-starting, especially, the higher $CR_e$ increases the compression temperature, so that at the time of injection a shorter delay and easier startability is achieved; but it is the higher TAM that raises the Enthalpy of the air mass to really improve the cold-starting process; as explained before and in the aforementioned SAE papers of reference. The higher $CR_e$ can still allow a reduction of the $CR_n$ to the point where, even if with the final combination of $CR_n$ and IVC the final $CR_e$ equals the initial; the engine will still shows better startability, because there is more TAM and more Enthalpy available to supply the fuel's heat of evaporation and lose less heat and temperature in the process; because the new chamber, with a lower $CR_n$, also has a lower S/V. The increased TAM is also very effective in producing quieter, smoother idle and acceleration; plus increased torque at low speeds. Incredibly, as recently found on very-modern high-speed gasoline engines running at well-over 5000 RPM, the earlier IVC is still effective in trapping more air mass, and producing higher power. This just proves how late, and inefficient, current IVC points on current diesel engines really are. This gas-exchange process is well explained in SAR Paper 2001-01-0278.

Under normal operation; during the compression process, the Tam in the cylinder is displaced to the center of the main chamber 15; while a portion of it enters the Energy-Cell 40. Notice, in FIGS. 1 and 2, that the cylinder head is of the radial-valve design, with the fire-deck formed as a hemisphere or truncated cone. My U.S. Pat. No. 5,570,665, titled "Valve Train for Internal Combustion Engines", issued Nov. 5, 1996; U.S. Pat. No. 5,626,110, titled "Valve Train for Internal Combustion Engine", issued May 6, 1997; U.S. Pat. No. 5,638,783, titled "Valve Train for an Internal Combustion Engine; issued Jun. 17, 1997; U.S. Pat. No. 5,645,023, titled "Valve Train for an Internal Combustion Engine", issued Jul. 8m 1997; U.S. Pat. No. 5,651,337, titled "Carrier for Camshaft and Tappet Support", issued Jul. 29, 1997; U.S. Pat. No. 5,669,344, titled "SOHC System with Radial Valves", issued Sep. 23, 1997; U.S. Pat. No. 5,673,660, titled "Valve Train for an Internal Combustion Engine", issued Oct. 7, 1997; and U.S. Pat. No. 5,682,849, titled "Rocker Arm-Tappet Connector for Radial Valves and Vertically-Operating Crosshead", issued Nov. 4, 1997; cover my different designs for Radial Valves and the new necessary valve-train and cylinder-head components; and explain the benefits of such designs on the combustion process. Whereas this particular type of valve train is preferred, especially in cases where the pistons have a very-low compression distance, and therefore a very-small vertical space to locate the Energy-Cell; engines with flat fire-desks and conventional valve-trains can also adopt the new combustion system, provided that the piston has a compression height high-enough to accept the Energy-Cell.

With this new fast-combustion system, it is intended for the injection to start very-close to TDC; with only enough lead-time for the delay period to be completed to initiate combustion at around TDC. As explained already, injection plumes 70 through the auxiliary spray-holes 69 spread through the main chamber to create a multitude of relatively weak "kindling" spots; from which successive injection quantities can begin to burn gradually in the main chamber. Injection through the pintle orifice is throttled, so that their initial spray from this source is controlled to the minimum amount just needed to ignite with minimum delay. Notice that this new double approach, including part of the fuel being throttled, achieves the same objectives of reduced fuel-flow at the front-end of injection on which so much research effort has been spent; trying to accomplish it with mechanically-incompetent versions of a new and failed type of rotary-shell variable discharge multi-hole tip for DI engines. With our design subject of this invention, it is only after ignition of the small throttled pintle-discharged plume occurs, smoothly and quietly, that the pintle's obturator 66 ceases to restrain the fuel flow through the main discharge pintle orifice 64, and higher flows start being delivered for rapid subsequent combustion, both in the main chamber and in the energy-cell. The distance from the nozzle-tip pintle-discharge hole 64 to the main transfer passage 44 in the energy-cell 40; the conical pintle spray angle, and the diameter of the Cell's funnelled main-transfer passage 44, control the initial amount of fuel entering the energy-cell; as the piston is still close to TDC. Much as in the Lanova Combustion Process, the periphery of the main fuel-plume peels-off and ignites while travelling, still airborne in the main-chamber 15, on its way to the Cell 40. The controllable amount of fuel that ignites and burns while traveling airborne through the main chamber 15 is used to also control and reduce the amount of fuel that initially enters the energy-cell 40; thus serving to limit its overfuelling. The amount of fuel that does enter the energy-cell is already burning (or ignites quickly thereafter); as there is already combustion taking place at many points in the main-chamber 15. With the various ignition points in the main-chamber 15; even if it is already past the point of piston TDC, the total fuel injected, both by the main-fuel plume 80 and the small auxiliary plumes 70, all burning simultaneously, are rapidly increasing the pressure in the main chamber 15 and forcing more air into the energy-cell 40, in which still lower-pressure exists and in which; perhaps (under some conditions), ignition has not yet taken place. As air enters the cell 40 through the helically-inclined transfer passages 44, it generates swirl inside the cell 40; to accelerate the combustion of the raw and partially-burning fuel entering it. The amount of air entering the cell 40 is just short of the proportion of the cell-volume to the total Clearance-Volume $C_V$; that is, only a portion of the TAM. The energy spent in swirling this small mass of air is far-less than used to make all the air swirl, as in today's conventional DI diesels. Not only that, but the internal cell-swirl is generated just as it is about to be used; not three-quarters to one full engine-revolution ahead (as in today's DI engines); thus avoiding the energy-loss due to time-related swirl-decay.

The internal swirl in the energy-cell 40 causes rapid combustion therein; eventually (after enough fuel has entered it), at a faster rate of pressure rise than in the larger main-chamber 15; because of the lower instantaneous A/F (richer; more active mixture) in the cell 40. From this point, with the higher pressure in the cell 40, the products of its combustion are transferred to the main-chamber 15 through all the cell transfer-passages. As visualized in FIG. 2, which shows the piston at the proper distance for this engine (at 15° C.A. ATDC), the cell's reflux through the main-passage 44, just as in the Lanova engines, starts breaking-up the core 81 of the main fuel-plume 80; while its peripheral cone 82 is burning as a diffusion flame all the way back to the nozzle tip 61. The strong reflux of combustion products from the cell 40, with an A/F richer than that found in the main-chamber's average (but still leaner than Stoichiometric; to avoid heavy soot formation inside the cell 40), burns its air-excess in the maelstrom against the fuel-rich core 81 of the main fuel-plume 80, and turns it back, to complete a very-fast burn, in the main chamber 15. This is depicted, in FIG. 2, by the bulge of fuel 83 spreading radially at the outside of the top funnelled entrance 45 of the main transfer-passage 44 (both better seen in FIG. 1). The process of rejecting further fuel entry into the energy-cell 40 is aided by the increasing distance between the nozzle tip 61 and the main transfer-passage 44 of the energy-cell 40, as the piston moves away from TDC during expansion; and the larger inner core 81 of the fuel-plume 80 increasingly misses the entrance of the main transfer-passage 44. This is new technology not found on the old Lanova engines, in which the length of the main fuel-plume, between the nozzle tip and the entrance to the energy-cell, was constant. Throughout these events, with the piston moving-away from TDC, some of the air in the bowl migrates from its center to the empty volume being generated in the periphery (squish-area) 33 of the main chamber 15; between the piston and fire deck, where, before TDC, there was little volume. This migration carries the burning masses from the center of the bowl to the periphery of the cylinder, for continued burning until completed, but with a progressively higher (leaner) A/F ratio as it expands to the larger volumes at the chamber's periphery.

The combustion process with leaner peripheral combustion lowers the piston's peripheral temperatures, reducing the heat losses to the cylinder's walls, rings and piston at those points. This can produce great benefits, as the ring-pack can be moved upwards without fears of excessive temperature and "ring-sticking"problems due to coking. The twin semi-circular cavities 90, interposed between the deep center of the piston and the skirt-walls behind the ring-pack, provide a natural heat-transfer barrier for the heat from the energy-cell 40 and, additionally, allows cooling-oil to enter and cool the rings from behind. This is well-explained in my concurrent patent application No. 10/378,281, dated Mar. 3, 2003; which covers an advanced piston design that, by allowing a higher ring-pack, reduces the headland clearance. This is extremely beneficial for cold-starting and operation in general, as explained in the aforementioned patent application.

During the main period of injection, after the obturator portion 66 of the pintle 62' disengages from the main discharge passage 64 and unthrottled fuel begins flowing with the main fuel plume 80; the smaller auxiliary sprays 70 continue burning while the air migrating to the peripheral volumes 33 of the main chamber 15 also carries them along easily; because of the low kinetic energy of the relatively-small individual masses of fuel in each plume. The fuel thus discharged enters the main chamber 15 when the piston 16 is already moving away from TDC, on the expansion stroke, and should not impinge on it, thus finishing its burn in a shorter period of time; while airborne. The preferentially circular and repeating phasing of the auxiliary fuel sprays 70 on the nozzle tip 61 (achieved by conventional keying means) and the auxiliary transfer-passage discharges 48 (achieved by keying the energy-cell 40 conventionally to the piston 16), ensures that the discharges from the auxiliary sprays 70; and the auxiliary transfer passages 48 cross in space without directly merging into each-other, but nevertheless creating enough fluid motion thereinbetween to further accelerate their mixing and the late, but rapid combustion; all while airborne with minimum impingement on any of the colder walls of the combustion chamber.

Referring to FIGS. 2 and 3; it is at this point in the cycle when the second function of the auxiliary transfer passages 48 comes into play. The discharge from the rear transfer passage is shown in FIG. 2 as arrows "D"; pushing the products of energy-cell combustion to the right in the Figure. Also, the discharge from the left transfer-passage 48 is shown as arrow "C" going straight upwards; when in reality these are moving at an angle into the paper; and the discharge from the right passage 48 is not shown at all, as the flow is out of the paper. The clockwise rotation of the discharges, depicted in FIG. 3 as arrows "Z", is intended to create some swirl in the chamber 15; also for the purposes of improved mixing between the different streams of fuel and air; but, more importantly; to help keep the fuel from reaching the periphery of the combustion chamber 15, and the cylinder walls 14, too early. This function is intended to maintain one of the main themes of this combustion system; that is; airborne combustion in the main-chamber 15. Thus, with all the small contributions from the other different combustion sub-systems and airborne burning of the fuel; a better, faster combustion, with lower fuel consumption and emissions, can be achieved.

The beneficial effects of the inverted fuel funnel of the M.A.N. engines, which provided a long path for the fuel plume to break-up and burn while airborne, is replicated in this new energy-cell combustion system by the long fuel-plume free-path between the injector tip 61 and the energy-cell 40. However, contrary to the M.A.N. engine and its "fuel funnel", in which the "funnel" was formed as an extension of the main combustion chamber and had a large S/V and associated losses to the coolant; with the energy-cell system subject of this application the mixing and burning is accomplished in the hottest area at the center of the main-chamber 15; away from any walls and large S/V areas that would increase the heat losses. Nevertheless, on some engines, especially those with short piston-compression distances it may be wise to increase the fuel plume free-path length; and the new design does so by providing the possibility of using a recess 75 for the injector 60, as shown in FIGS. 1 and 2.

Various charges and modifications can be made to the combustion systems described above without departing from the spirit of the invention. Such changes and modifications are contemplated by the inventor and he does not wish to be limited except by the scope of the appended claims.

I claim:

1. An improved combustion system for a diesel engine having at least one cylinder with a side wall; a piston with a top surface mounted in said cylinder for reciprocal movement therein; a cylinder head with a fire-deck surface overlaying the cylinder to form, in combination with the top of the piston and the side walls of the cylinder a combustion chamber; at least two intake passages extending in the cylinder head for directing air flow to the combustion chamber, at least two intake valves to control air flow through the intake passages into the combustion chamber; at least one exhaust passage extending in the cylinder head for discharging exhaust from the combustion chamber; the exhaust passage having at least one exhaust valve to control exhaust flow through the exhaust passage; a fuel injector mounted in the cylinder head substantially central to the associated cylinder and piston; said piston having a deep bowl-like cavity formed therein and positioned substantially on the centerline of said piston and cylinder; an energy-cell formed in said bowl-like cavity and covered by a cap member, a space formed above said energy-cell and below the bottom surface of said cylinder head creating a main combustion chamber; the improvement characterized by;

said fuel injector having a hybrid nozzle tip with a central outlet controlled by a movable pintle extension of the nozzle needle to discharge a central injection of fuel into the combustion chamber substantially along the centerline of the cylinder and piston;

said hybrid nozzle tip also having auxiliary outlets disposed about the central outlet to discharge a plurality of fuel plumes angled from the centerline of the cylinder;

said energy-cell being in fluid communication with said main combustion chamber through a plurality of transfer passages extending through said cap member; said transfer passages including a main central passage aligned with the centerline of said piston, and also including a plurality of peripherally disposed passages about said main central passage;

said cap member being disposed within said piston's bowl-like cavity so that it is always spaced from said nozzle tip of said fuel injector; the distance thereinbetween being sufficient so that a central fuel plume discharged from the central outlet of said fuel injector first travels through the hot compressed air in said main combustion chamber located above said cap member of said energy-cell and ignites therein before a significant portion of said fuel plume passes through said central transfer passage of said cap member into said energy-cell for subsequent combustion therein.

2. The improved combustion system for a diesel engine as defined in claim 1 further characterized by:

said piston being provided with a plurality of deep valve relief notches formed in alignment with each of said valves thereby permitting sufficient motion of said valves during an overlap period of operation to prevent contact with said piston; the depth of said notches being sufficiently great to permit valve timing in which a very late Exhaust Valve Opening (EVO) can be utilized with a relatively large valve-duration period.

3. The improved combustion system for a diesel engine as defined in claim 1 further characterized by:

said valves being recessed in said cylinder head for exclusively permitting a free flow motion of air passing from the intake to the exhaust valves during a valve overlap period of engine operation thereby preventing contact between the valves and piston, thereby allowing the valve timing characterized by an early Intake Valve Closing (IVC) and very late Exhaust Valve Opening (EVO) events, all without reducing a relatively substantial valve-duration period.

4. The improved combustion system for a diesel engine as defined in claim 1 further characterized by:

said cylinder head provided with recessed valves, and said piston being provided with valve-relief notches intended to provide a relatively free-flow path for air from said intake valves and into said exhaust valves and preventing contact between the valves and the piston particularly during a valve overlap period of engine operation thereby allowing an unreduced valve duration period thus permitting valve timing with very early Intake Valve Closing (IVC).

5. The improved combustion system for a diesel engine as defined in claim 1 further characterized by:

said cylinder head provided with recessed valves, and said piston being provided with valve-relief notches intended to provide a relatively free flow path for gases from said main combustion chamber and toward said exhaust valve and preventing contact between the valves and the piston particularly during a valve overlap period of engine operation thereby allowing an unreduced valve-duration period and thus permitting valve timing with very late Exhaust Valve Opening (EVO).

6. The improved combustion system for a diesel engine as defined in claim 1 further characterized by:

said peripheral transfer passages formed in said cap member being inclined with respect to the centerline of the energy-cell.

7. The improved combustion system for a diesel engine as defined in claim 1 further characterized by:

said inclined peripheral transfer passages on said cap member of said energy-cell being configured to induce a rotational motion of air as it enters said energy-cell whereby the rotational motion imparted to the air entering said energy-cell is arranged about said centerline of said energy-cell and to induce a rotational motion of gases discharged from said energy-cell into said main combustion chamber, said rotation of gases taking place about said main central transfer passage of said energy-cell thereby accelerating the combustion process within said main combustion chamber.

8. The improved combustion system for a diesel engine as defined in claim 1 further characterized by:

said peripheral transfer passages in said cap member of said energy-cell being inclined at a radial angle with respect to the centerline of said energy-cell.

9. The improved combustion system for a diesel engine as defined in claim 1 further characterized by:

the opening of said peripheral transfer passages of said energy-cell into said main combustion chamber being radially spaced outward from the opening of said peripheral transfer passage into the energy-cell interior of said energy-cell.

10. The improved combustion system for a diesel engine as defined in claim 1 further characterized by:

the opening of said peripheral transfer passages of said energy-cell into said main combustion chamber having a larger cross-sectional flow area than the flow area of the opening of said peripheral transfer passages into the interior of said energy-cell.

11. The improved combustion system for a diesel engine as defined in claim 1 further characterized by:

said central transfer passage in said cap member of said energy-cell having an opening to said main combustion chamber with a larger cross-sectional flow area than the flow area of said central transfer passage into the interior of said energy-cell.

12. The improved combustion system for a diesel engine as defined in claim 1 further characterized by:

said fuel injector having a central discharge orifice incorporating a throttling-type pintle therefor to control the flow of fuel from the injector; said central discharge orifice being axially aligned with the central transfer passage in said cap member of said energy-cell to discharge fuel thereto.

13. The improved combustion system for a diesel engine as defined in claim 1 further characterized by:

said orifice end portion of said fuel injector being recessed from said fire-deck surface of said cylinder head to provide a significant flow-path for fuel injected from the orifice end of said fuel injector before it enters said central transfer passage in the cap member of said energy-cell thereby creating a substantial fuel plume through said main combustion chamber to provide improved ignition of the fuel.

14. The improved combustion system for a diesel engine as defined in claim 1 further characterized by:

said energy-cell having a wall configuration spaced from surfaces of said piston to create an air-gap thereinbetween thereby decreasing the heat loss from the interior of said energy-cell.

15. The improved combustion system for a diesel engine as defined in claim 14 further characterized by:

insulating material within at least a portion of said air-gap to further reduce the heat losses from said energy-cell.

16. The improved combustion system for a diesel engine as defined in claim 2 further characterized by:

said notches in said piston under said intake valves having a depth greater than 7% of the total intake valve lift; to provide additional timing advance of the intake valve events and increased real physical valve overlap without incurring physical contact between said intake valves and the bottom of said notches in said piston during said valve overlap period.

17. The improved combustion system for a diesel engine as defined in claim 2 further characterized by:

said notches in said piston under said exhaust valves having a depth greater than 5% of the total exhaust valve lift; to provide additional timing retard of the exhaust valve events and increased real physical valve overlap without incurring physical contact between said exhaust valves and the bottom of said notches in said piston during said valve overlap period.

18. The improved combustion system for a diesel engine as defined in claim 3 further characterized by:

said recessed distance of the intake and exhaust valves with respect to the upper combustion chamber surface of the cylinder head being deeper than 7% and 5% respectively of the total lift of said intake and exhaust valves; to allow earlier intake valve events and later exhaust valve events, and greater valve overlap without incurring physical contact between said intake and exhaust valves and the bottom of said notches in said piston during said valve overlap period.

19. The improved combustion system for a diesel engine as defined in claim 1 further characterized by:

said fuel injector having an orifice end portion being recessed from said upper surface of said main combustion chamber in said cylinder head to increase the flow-path length for fuel injected from said orifice end of said fuel injector in respect to said main combustion chamber so as to obtain ignition of the fuel while traversing said main combustion chamber before a significant portion of said injected fuel enter said energy-cell.

* * * * *